Figure 2:
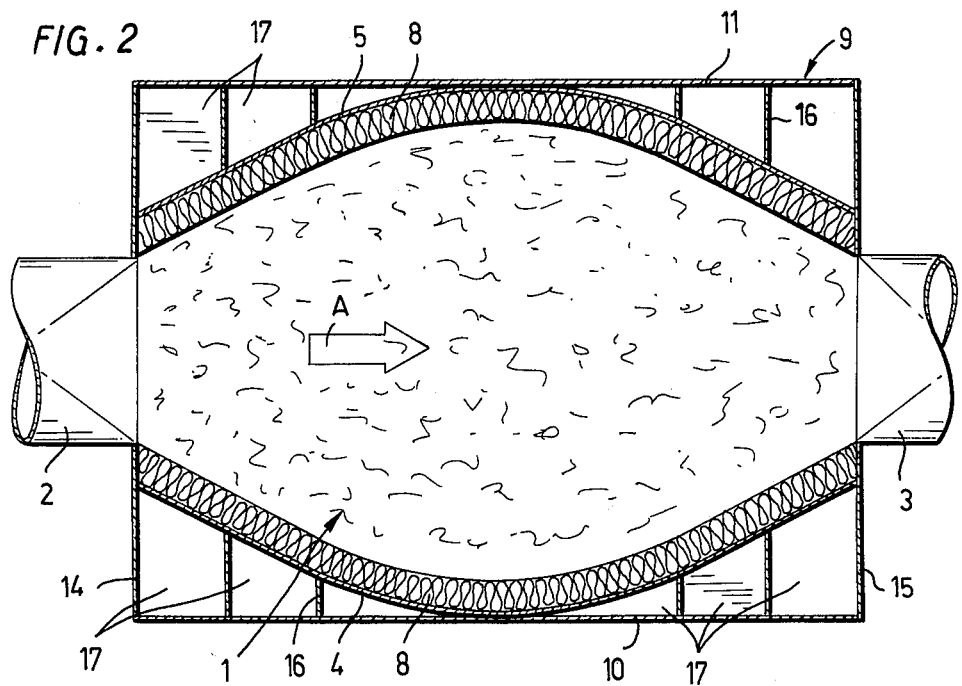

United States Patent [19]

Purhonen

[11] 4,109,754
[45] Aug. 29, 1978

[54] NOISE ABSORBER FOR AIR OR GAS FLOWS

[75] Inventor: Matti Purhonen, Helsinki, Finland
[73] Assignee: Temet OY., Helsinki, Finland
[21] Appl. No.: 759,520
[22] Filed: Jan. 14, 1977
[30] Foreign Application Priority Data
Jan. 21, 1976 [FI] Finland .................................. 760137
[51] Int. Cl.² .............................................. F01N 1/04
[52] U.S. Cl. .................................................. 181/252
[58] Field of Search ............... 181/224, 252, 247, 248, 181/255, 249

[56] References Cited
U.S. PATENT DOCUMENTS
2,994,401 8/1961 Bourne et al. ........................ 181/224
3,955,643 7/1974 Clark .................................... 181/248

Primary Examiner—Robert C. Watson
Attorney, Agent, or Firm—Ladas, Parry, Von Gehr, Goldsmith & Deschamps

[57] ABSTRACT

A noise absorber for air or gas flows, which comprises a flow channel provided at opposite ends with flow inlet and outlet connections. One pair of opposite walls of the flow channel extends concavely and the other pair of opposite walls extends convexly from the inlet connection to the outlet connection. The flow channel is positioned in a surrounding box. Closed hollow spaces are formed between each wall of the flow channel and the opposite wall of the box, which spaces form compartments acting as resonator and/or absorption mufflers.

7 Claims, 5 Drawing Figures

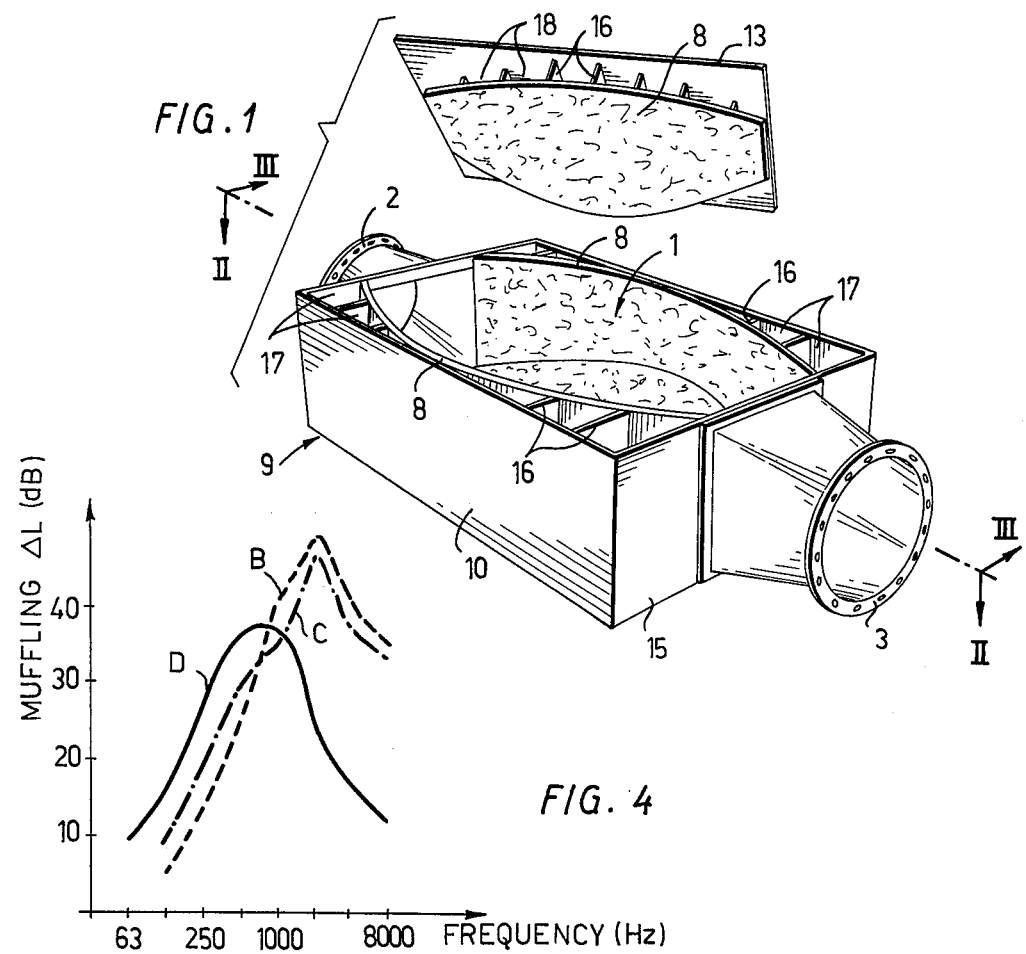
FIG. 1
FIG. 4
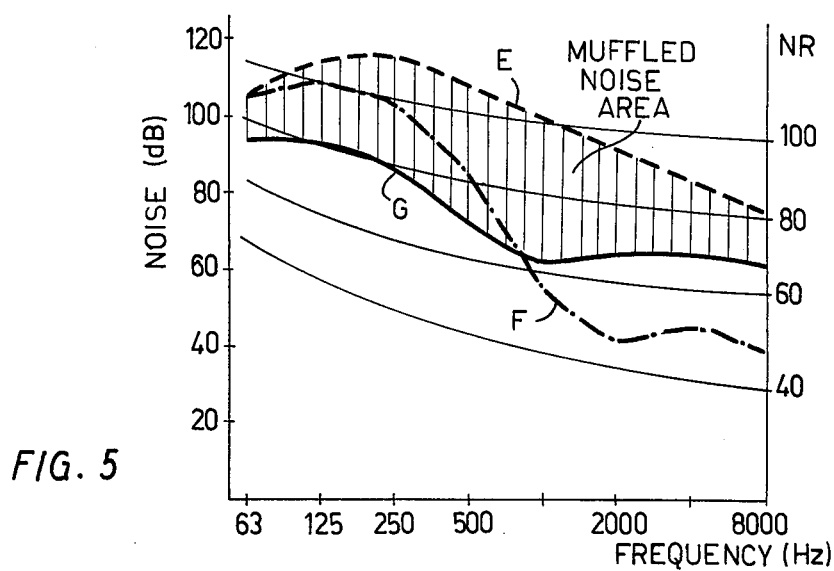
FIG. 5

NOISE ABSORBER FOR AIR OR GAS FLOWS

The subject of the present invention is a noise absorber for air or gas flows, said noise absorber comprising a flow channel, the opposite ends of said channel being provided with inlet and outlet connections and the cross-section of said channel being substantially rectangular, whereby one pair of walls of the flow channel extends concavely and the other pair of walls convexly from the inlet connection to the outlet connection.

It is a previously known system to use a similar muffler in order to reduce the noise caused by an air or gas flow passing in a channel or pipe or the noise produced by various flow producing machines and equipment and spreading through a channel or pipe to the environment. A noise absorber of the type described above is in several respects more advantageous than other conventional noise absorbers, e.g., because the flow resistance, and thereby the production of noise in the noise absorber itself, is, owing to the flow-technically advantageous form, lower, because the requirement of muffling material is, owing to the small wall area of the flow channel, lower, and because the requirement of space is, owing to the low flow resistance, smaller. The noise absorber of the type described above, however, involes the same drawback as other known mufflers do, i.e. excessively poor absorption of low frequencies of the noise and excessively high absorption of high frequencies (above 1000 Hz i.e. 1000 c/s) of the noise, whereby the low frequencies are sensed as more disturbing than normal.

The object of the present invention is to provide a noise absorber that is capable of also muffling low noise frequencies efficiently, and this object is achieved by means of a noise absorber in accordance with the present invention, which is characterized by external compartments provided at the walls of the flow channel and functioning as resonator and/or absorption mufflers.

By means of the noise absorber in accordance with the present invention it is possible to muffle also low (63 to 250 c/s) and medium (below 1000 c/s) noise frequencies efficiently. This is due to the external compartments, which operate as resonator and/or absorption mufflers and thereby muffle different noise frequencies than the flow channel itself. By modifying the dimensioning of the flow channel and the shape, dimensioning and positioning of the compartments, it is possible to adjust the noise-absorption range without a substantial change in the favourable flowtechnical properties of the muffler. The compartments can be placed between the curved walls of the flow channel and a surrounding box having the shape of a rectangular prism and being tangent to said curved walls, whereby the compartments do not increase the space requirement of the muffler in the longitudinal, lateral, or height direction. Thus, the muffler can be designed so low that it fits into normal ventilation and air-conditioning channels, and the muffler is thereby particularly well suitable for absorbing the low- and medium-frequency noise produced by ventilation equipment (various blowers, adjusting units, various channel components, etc.).

Figure 3:
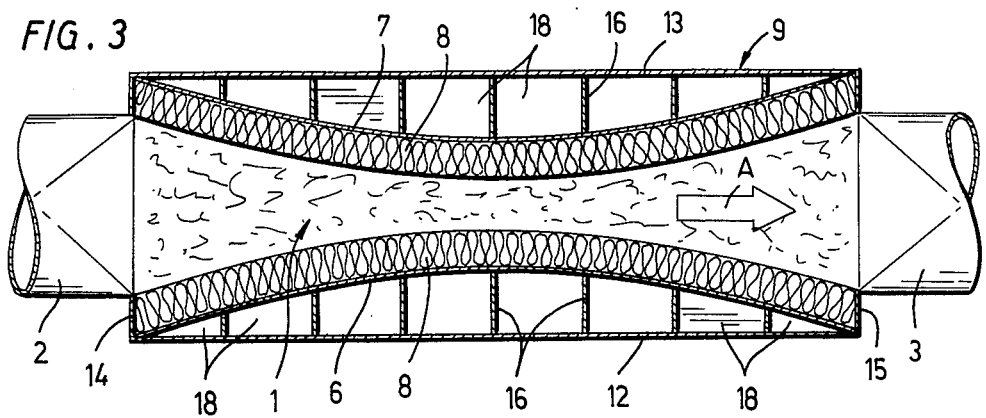

The invention will be described more closely below with reference to the attached drawings, wherein FIG. 1 is a perspective view of an embodiment of a noise absorber in accordance with the present invention as partly disassembled, FIGS. 2 and 3 are cross-sections of the noise absorber along lines II—II and III—III in FIG. 1, FIG. 4 shows a set of curves illustrating the muffling at different frequencies obtained by means of specific dimensioning, and FIG. 5 shows a set of curves illustrating the muffling of noise produced by a blower when using different mufflers.

The noise absorber shown in the drawings comprises a flow channel 1, whose opposite ends are provided with an inlet connection 2 and with an outlet connection 3, respectively for passing-through the air flow produced by a blower. The flow channel consists of four curved walls 4,5,6 and 7, the pair formed by the walls 4,5 extending concavely in relation to the inside of the channel and the pair formed by the walls 6,7 extending convexly from end to end in the channel. Thus, the walls 4,5 become more distant from each other and the walls 6,7 come closer to each other towards the middle of the channel. The walls are positioned perpendicularly to adjoining walls, so that the cross-section form of the flow channel is rectangular in a plane perpendicular to the path of flow. Due to the curved shape of the walls, the cross-sectional area of the channel remains substantially unchanged from end to end in the channel. An insulating layer 8 of a noise-absorbing material is fixed onto the inner surface of the walls.

According to the invention, the flow channel 1 is positioned inside a box 9 of the shape of a rectangular prism, consisting of side walls 10,11,12, 13 and end walls 14,15. The walls 10,11 are tangential to the concave walls 4,5 of the channel at their middle points, and the walls 12,13 touch the convex walls 6,7 at their ends, Between each wall of the channel and the corresponding wall of the box, partition walls 16 are fixed at a distance from each other in the direction of flow A, which walls extend transversely to the flow direction. In this way, a number of compartments are formed between the flow channel and the box.

The volume of the compartments 17 between the concave walls 4,5 of the flow channel and the corresponding walls 10,11 of the box then becomes smaller from the inlet connection 2 towards the middle of the walls and thereafter becomes larger towards the outlet connection 3, as appears from FIG. 2. On the contrary, the compartments 18 between the convex walls 6,7 of the flow channel and the corresponding walls 12,13 of the box become larger from the inlet connection 2 towards the middle of the walls and thereafter become smaller towards the outlet connection 3.

The insulation layer 8 in the flow channel generally reduces the noise produced by the flow and by the blower, and the external compartments around the flow channel function as resonator and/or absorption mufflers which especially muffle low noise frequencies.

FIG. 4 graphically illustrates the muffling within different frequency ranges, the curves B and C showing the muffling capacity of two known noise absorbers, whereas the curve D illustrates the muffling capacity of the muffler in accordance with the present invention. It is noticed that the known mufflers muffle ventilation noise poorly at low and medium frequencies and excessively strongly at high frequencies, where there is, as a rule, no major need of muffling. On the contrary, the muffler in accordance with the invention muffles efficiently at low and medium frequencies and sufficiently at higher frequencies, whereby the muffling degrees at the different frequency ranges are better suitable for combating the noise produced by ventilation equipment.

FIG. 5 graphically shows the noise curve E of a blower without muffling. Curve F shows the noise curve when the noise has been muffled by means of a known muffler. It is noticed that the muffling is excessive at high frequencies, whereby the low-frequency noises are distinguished clearly. Curve G shows the noise curve of the blower as muffled by a muffler in accordance with the present invention. It is noticed that the muffling, which is illustrated by the area with vertical lines, is more uniform throughout the entire range of frequencies and that an efficient muffling is also achieved within low and medium frequencies. The muffled noise curve G substantially follows the curve NR-80.

The drawings and the related description are only intended to illustrate the idea of the invention. In its details, the noise absorber in accordance with the present invention may show even considerably variation within the scope of the patent claims.

What we claim is:

1. A noise absorber for an air or gas flow, including wall means defining a flow channel and inlet and outlet connections at opposite ends of said flow channel, said flow channel being substantially rectangular in cross-section and said wall means comprising two pair of opposed, curved walls, said walls extending from the inlet connection to the outlet connection and defining respective sides of said substantially rectangular cross-section, the opposed walls of one pair being concave towards each other and the opposed walls of the other pair being convex towards each other, and the noise absorber also comprising means defining compartments externally of said walls and functioning as resonator and/or absorption mufflers.

2. A noise absorber as claimed in claim 1, wherein the compartments extend across the corresponding walls transversely to the flow direction.

3. A noise absorber as claimed in claim 1, wherein the compartments at each wall are of different volumes, as compared with each other, on the half extending from the inlet connection to the middle point of the wall and, correspondingly, on the half extending from the middle point to the outlet connection.

4. A noise absorber as claimed in claim 3, wherein the volume of the compartments of one pair of walls becomes smaller in the flow direction on the first half of the walls and becomes larger on the second half, and the volume of the compartments of the other pair of walls becomes larger on the first half and smaller on the second half.

5. A noise absorber as claimed in claim 1, wherein the flow channel is enclosed by a box having the shape of a rectangular prism.

6. A noise absorber as claimed in claim 5, wherein the walls of said one pair abut the corresponding walls of the box at their middle points and the walls of said other pair abut the corresponding walls of the box at their ends.

7. A noise absorber as claimed in claim 5, wherein between each wall of the flow channel and the corresponding wall of the box, partition walls are arranged which are transverse to the flow direction and which form said compartments between said partition walls.

* * * * *